United States Patent
Esclusa et al.

(10) Patent No.: US 11,741,527 B1
(45) Date of Patent: Aug. 29, 2023

(54) SYSTEMS AND METHODS FOR DISTRIBUTED COMMERCE BASED ON A TOKEN ECONOMY

(71) Applicant: BAMBUMETA, LLC, New York, NY (US)

(72) Inventors: William Esclusa, Rosweel, GA (US); Patrick James Faiola, Nashua, NH (US)

(73) Assignee: BAMBUMETA, LLC, New York, NY (US)

( * ) Notice: Subject to any disclaimer, the term of this patent is extended or adjusted under 35 U.S.C. 154(b) by 0 days.

(21) Appl. No.: 17/819,110

(22) Filed: Aug. 11, 2022

(51) Int. Cl.
| | |
|---|---|
| *G06Q 30/00* | (2023.01) |
| *G06Q 30/0601* | (2023.01) |
| *H04L 9/32* | (2006.01) |
| *H04L 9/00* | (2022.01) |

(52) U.S. Cl.
CPC ....... *G06Q 30/0633* (2013.01); *H04L 9/3213* (2013.01); *H04L 9/50* (2022.05); *H04L 2209/56* (2013.01)

(58) Field of Classification Search
CPC .... G06Q 30/00; G06Q 30/06; G06Q 30/0601; G06Q 30/0623; G06Q 30/0625; G06Q 30/0633; G06Q 30/0641
See application file for complete search history.

(56) References Cited

U.S. PATENT DOCUMENTS

| | | | | |
|---|---|---|---|---|
| 6,731,788 | B1* | 5/2004 | Agnihotri | G11B 27/28 |
| | | | | 382/165 |
| 8,458,053 | B1* | 6/2013 | Buron | H04N 21/4316 |
| | | | | 705/26.1 |
| 8,660,912 | B1* | 2/2014 | Dandekar | G06Q 30/02 |
| | | | | 705/26.1 |
| 2007/0050406 | A1* | 3/2007 | Byers | G06F 16/48 |
| 2007/0106570 | A1* | 5/2007 | Hartman | G06Q 30/0633 |
| | | | | 705/26.8 |

(Continued)

OTHER PUBLICATIONS

Okonkwo, Ifeanyi E. "NFT, copyright and intellectual property commercialization." International Journal of Law and Information Technology 29.4 (2021): 296-304. (Year: 2021).*

(Continued)

*Primary Examiner* — Christopher B Seibert
(74) *Attorney, Agent, or Firm* — Ansari Katiraei LLP; Arman Katiraei; Sadiq Ansari (57) ABSTRACT

Disclosed is a web 3.0 orchestration system that creates a token economy through which customers are able to establish relationships and purchase physical and digital goods and services from any merchant at any place without having to access the physical or digital storefront of the merchant. The orchestration system may receive a triggering event from a user device, may compile user data from user profiles that are associated with the user device, and may select a distributed set of smart contracts defined by different merchants based on the triggering event. The orchestration system may execute the distributed set of smart contracts using the user data as inputs, may select offerings from a set of merchants based on the output generated from executing the smart contracts, and may present the offerings to the user device as part of facilitating a transaction between the user device and any of the merchants.

20 Claims, 8 Drawing Sheets

(56) References Cited

U.S. PATENT DOCUMENTS

| | | | | |
|---|---|---|---|---|
| 2007/0294240 | A1* | 12/2007 | Steele | G06F 16/951 |
| | | | | 707/999.005 |
| 2008/0167946 | A1* | 7/2008 | Bezos | G06Q 30/0214 |
| | | | | 705/26.1 |
| 2009/0037291 | A1* | 2/2009 | Dawson | G06Q 30/0603 |
| | | | | 705/27.2 |
| 2010/0114654 | A1* | 5/2010 | Lukose | G06Q 30/0256 |
| | | | | 705/14.54 |
| 2012/0136756 | A1* | 5/2012 | Jitkoff | G06F 16/9577 |
| | | | | 715/224 |
| 2012/0233020 | A1* | 9/2012 | Eberstadt | G06Q 30/06 |
| | | | | 705/26.1 |
| 2013/0013427 | A1* | 1/2013 | Gonsalves | G06Q 30/02 |
| | | | | 705/27.1 |
| 2014/0025521 | A1* | 1/2014 | Alsina | G06Q 30/0601 |
| | | | | 705/26.1 |
| 2014/0136990 | A1* | 5/2014 | Gonnen | H04L 51/18 |
| | | | | 715/752 |
| 2014/0297537 | A1* | 10/2014 | Kassemi | H04L 51/08 |
| | | | | 705/67 |
| 2015/0052061 | A1* | 2/2015 | Anderson | G06Q 20/409 |
| | | | | 705/44 |
| 2015/0088686 | A1* | 3/2015 | Glassberg | G06Q 50/01 |
| | | | | 705/26.8 |
| 2015/0095238 | A1* | 4/2015 | Khan | G06Q 20/382 |
| | | | | 705/71 |
| 2015/0317698 | A1* | 11/2015 | Kalyvas | G06Q 30/0214 |
| | | | | 705/14.66 |
| 2015/0324789 | A1* | 11/2015 | Dvorak | H04L 63/0861 |
| | | | | 705/67 |
| 2017/0232300 | A1* | 8/2017 | Tran | H04L 67/535 |
| | | | | 434/247 |

OTHER PUBLICATIONS

Sunyaev, Ali, et al. "Token economy." Business & Information Systems Engineering 63.4 (2021) (Year: 2021).*

* cited by examiner

SYSTEMS AND METHODS FOR DISTRIBUTED COMMERCE BASED ON A TOKEN ECONOMY

BACKGROUND

The client-server interactivity ushered in by web 2.0 gave rise to the platform economy. The platform economy may include the interactive applications, websites, and/or digital storefronts where ecommerce takes place.

The platform economy nevertheless retains many of the same delineations of physical storefronts. For instance, a user may open a first application or may access a first website in order to view the goods and services offered by a first merchant, and may open a second application or may access a second website in order to view the goods and services offered by second merchant. The interactions that the user has with each merchant remain with that merchant and mostly occur when the user access the merchant's platform.

DETAILED DESCRIPTION OF PREFERRED EMBODIMENTS

The following detailed description refers to the accompanying drawings. The same reference numbers in different drawings may identify the same or similar elements.

Provided are systems and methods for distributed commerce based on a token economy. The systems and methods may provide web 3.0 universal orchestration services that create a token economy through which customers are able to establish relationships and purchase physical and digital goods and services from any merchant at any place without having to access the physical or digital storefront of the merchant. The web 3.0 universal orchestration services may be implemented by an orchestration system of some embodiments.

The orchestration system may define and execute different sets of smart contracts or distributed programs based on different compiled sets of user data and different merchant targeting data. The execution of each set of smart contracts may produce a different outcome. The different outcomes may include selecting different offerings from the merchants based on the compiled user data satisfying different conditions set by the merchants for the promotion of the different offerings. Specifically, the smart contracts may include conditions that the merchants have defined or identified for selecting offerings from their respective inventories that are geographically, temporally, contextually, emotionally, and/or otherwise relevant or of most interest to the users based on current and past states of the users as identified through the compiled user data.

The orchestration system may present the selected offerings to the users, and the users may purchase physical or digital goods and/or services from the presented offerings of the different merchants wherever they may be at any time through the orchestration system and without having to access the physical or virtual storefronts of any of the merchants. Additionally, the users may earn loyalty bonuses and/or may interact in other ways with the merchants based on the offerings provided by the orchestration system on behalf of the different merchants. In this manner, the orchestration system may generate a web 3.0 token economy that increases sales conversion rates and better engages users than the previous web 2.0 platform economy.

Figure 1:
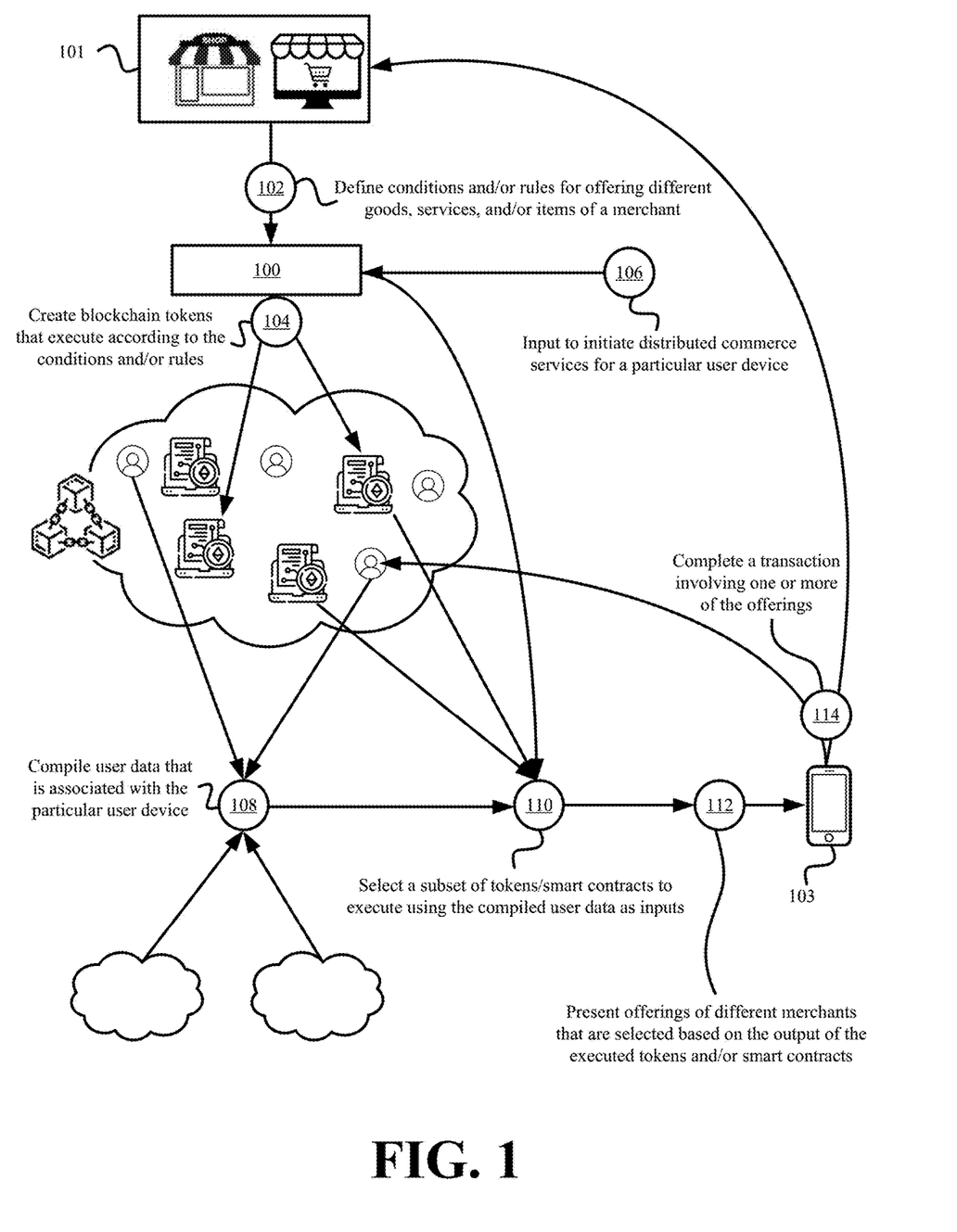
FIG. 1 illustrates an example of distributed commerce occurring on a token economy in accordance with some embodiments presented herein.

FIG. 1 illustrates an example of distributed commerce occurring on a token economy created by orchestration system 100 in accordance with some embodiments presented herein. Orchestration system 100 may create the token platform based on inputs from different merchants 101. Each merchant 101 may register with orchestration system 100, and may define (at 102) one or more sets of conditions and/or rules for offering different goods, services, and/or items of that merchant 101 to different users. For instance, a first merchant may define (at 102) conditions and/or rules for offering a set of clothing items to users in a particular geographical region, when the weather abruptly changes, and when stock market experiences a certain gain, and a second merchant may define (at 102) conditions and/or rules for offering a particular piece of furniture to users that have a specific style preference and that have recently changed addresses. Merchants 101 may customize their conditions and/or rules according to their own sales data, market analysis, detected trends, current promotions, etc.

Orchestration system 100 may create (at 104) one or more tokens that execute according to the merchant defined (at 102) conditions and/or rules. In some embodiments, a token may be a smart contract or block of executable code that is stored on the blockchain and that, upon execution, selects different items from the merchant inventory when different conditions or rules associated with the smart contract or block of executable code are satisfied.

Orchestration system 100 may receive (at 106) input for initiating the distributed commerce services for user device 103. In some embodiments, the input may be issued by user device 103. User device 103 may scan a quick response ("QR") code, barcode, or other encoded identifier that initiates the distributed commerce services, may provide location information to orchestration system 100 that matches the location of an event that triggers the distributed commerce services, may open an application that triggers the distributed commerce services, or may detect other user actions user device (e.g., clicking a link, visiting a website, receiving an email from a particular sender, communicating with one or more parties, etc.) that trigger the distributed commerce services. In some embodiments, the input may be issued from user device 103 as a result of one or more monitoring services running on user device 103. For instance, orchestration system 100 may install a monitoring service on the user device as a result of the user device registering for the distributed commerce services. The monitoring service may detect the occurrence of specific events that initiate the distributed commerce services.

In some embodiments, the input may be issued in response to social media posts, events, and/or other activity that involve or mention the user associated with user device 103. For instance, orchestration system 100 may detect a social media post that identifies the user associated with user device 103 attending an event that triggers the distributed commerce services. In some embodiments, the input for triggering the distributed commerce service may be unrelated to user device 103 or the user associated with user device 103. For instance, orchestration system 100 may trigger the distributed commerce services for a set of registered or participating users when a merchant has a sale, when an event is taking place in a geographic region where the set of registered or participating users are located, or periodically to maintain user engagement.

Orchestration system 100 may compile (at 108) the user data that is associated with user device 103. Orchestration system 100 may compile (at 108) the user data from one or more user profiles that are stored on the blockchain and that are created for the user that is associated with user device 103. For instance, a first user profile may be created as a first block on the blockchain when the user registers with a first merchant, and a second user profile may be created as a second block on the blockchain when the user registers with a second merchant. The first user profile may store interactions, purchases, preferences, and/or other data that the user shares with the first merchant, and the second user profile may store interactions, purchases, preferences, and/or other data that the user shares with the second merchant. The first user profile and the second user profile may be linked to or associated with the same unique identifier of the user. In some embodiments, the unique identifier may be generated based on a signature of the user device used by the user to access the different merchants, an Internet Protocol ("IP") address, and/or other values that may be uniquely associated with the user or the user device.

Orchestration system 100 may also compile (at 108) the user data from external sources. The external sources may include social media sites, public records, and/or other databases or repositories that contain publicly available information about the user associated with user device 103.

Orchestration system 100 may select (at 110) a subset of the generated tokens or the code within a subset of the smart contracts to execute using the compiled (at 108) user data as inputs. Orchestration system 100 may select (at 110) the tokens or smart contracts to execute based on the received (at 106) input that initiated the distributed commerce services for user device 103. More specifically, orchestration system 100 may select (at 110) tokens or smart contracts that are defined with a condition or rule involving the received (at 106) input. For instance, if orchestration system 100 initiates the distributed commerce services in response to detecting user device 103 at a particular event or location, orchestration system 100 may select (at 110) a first subset of generated tokens that include a condition or rule that requires user device 103 to be at the particular event or location. Similarly, if orchestration system 100 initiates the distributed commerce services in response to user device 103 visiting a particular website, orchestration system 100 may select (at 110) a second subset of generated tokens that include a condition or rule that requires user device 103 to visit the particular web site.

Orchestration system 100 may present (at 112) one or more offerings to user device 103 that are selected based on the output of the executed tokens and/or smart contracts. The one or more offerings may originate from different merchants 101, and may be customized based on the manner with which the compiled (at 108) user data satisfies various conditions and/or rules from the selected (at 110) subset of tokens and/or smart contract. The offerings may include physically or digital goods that the user associated with user device 103 may purchase, different services that the offering merchants 101 provide, promotions, news or information, loyalty rewards, and/or customized data that orchestration system 100 presents (at 112) to user device 103.

In some embodiments, presenting (at 112) the one or more offerings may include providing notifications on user device 103 that identify each offering as it become relevant and/or is selected based on the compiled (at 108) inputs. In some embodiments, presenting (at 112) the one or more offerings may include queuing the notifications on user device 103, and displaying the offerings to the user in response to the user opening a particular application, accessing a website, requesting to view the offerings, and/or otherwise interacting with user device 103 to display the offerings. In some embodiments, orchestration system 100 or user device 103 may generate a user interface ("UP") that contains and displays the one or more offerings.

Orchestration system 100 may complete (at 114) a transaction involving one of more of the presented (at 112) offerings. Completing (at 114) the transaction may include orchestration system 100 identifying the merchant that offers the purchased item, reconciling the purchase with the merchant by providing the data necessary for the merchant to fulfill the order (e.g., shipping information, payment, etc.), and recording the transaction on the blockchain. In some embodiments, orchestration system 100 may process payment on behalf of the merchant based on stored payment information of the user in the one or more user profiles, and may identify the purchased item to the merchant so that the merchant may fulfill the order. Recording the transaction may include linking a block with the transaction details to one or more user profiles that are associated with user device 103 and/or that are created for the merchant that sells the item.

In some embodiments, completing (at 114) the transaction may further include minting a non-fungible token ("NFT") for the purchased item, and linking the NFT to the user profile. The NFT may correspond to a digital representation of a physical good purchased by the user. For instance, the user may purchase a shirt with a particular design, and the NFT may be a digital version of the shirt or the particular design that identifies the user as the owner of the shirt, the particular design, or the digital version of the shirt or the particular design. In some embodiments, the user may own and wear the shirt, and may receive the digital version of the shirt as a bonus item that may be used to customize avatars, characters, and/or objects in one or more digital environments (e.g., video game characters, the metaverse, etc.). In some embodiments, the NFT may correspond to a digital good that is purchased by the user. For instance, the user may purchase digital artwork, and orchestration system 100 may mint the NFT to record the user as the owner of the digital artwork on the blockchain.

Once the transaction is complete (at 114), the purchased items may be linked to the user profile through different blocks that have been created on the blockchain. Accordingly, orchestration system 100 may track the purchase history of the user across different merchants. Moreover, orchestration system 100 may provide customer service on behalf of the different merchants that the user has purchased physical and digital goods from. For instance, the user may wish to return an NFT or digital artwork that the user has purchased. Orchestration system 100 may determine that the user is the listed owner of the NFT or digital artwork on the blockchain, determine, based on a smart contract, that the purchase date is within a return window offered for the NFT or the digital artwork, and may initiate the return by refunding the purchase price to the user and removing the user as the owner of the NFT or digital artwork from the blockchain.

Figure 2:
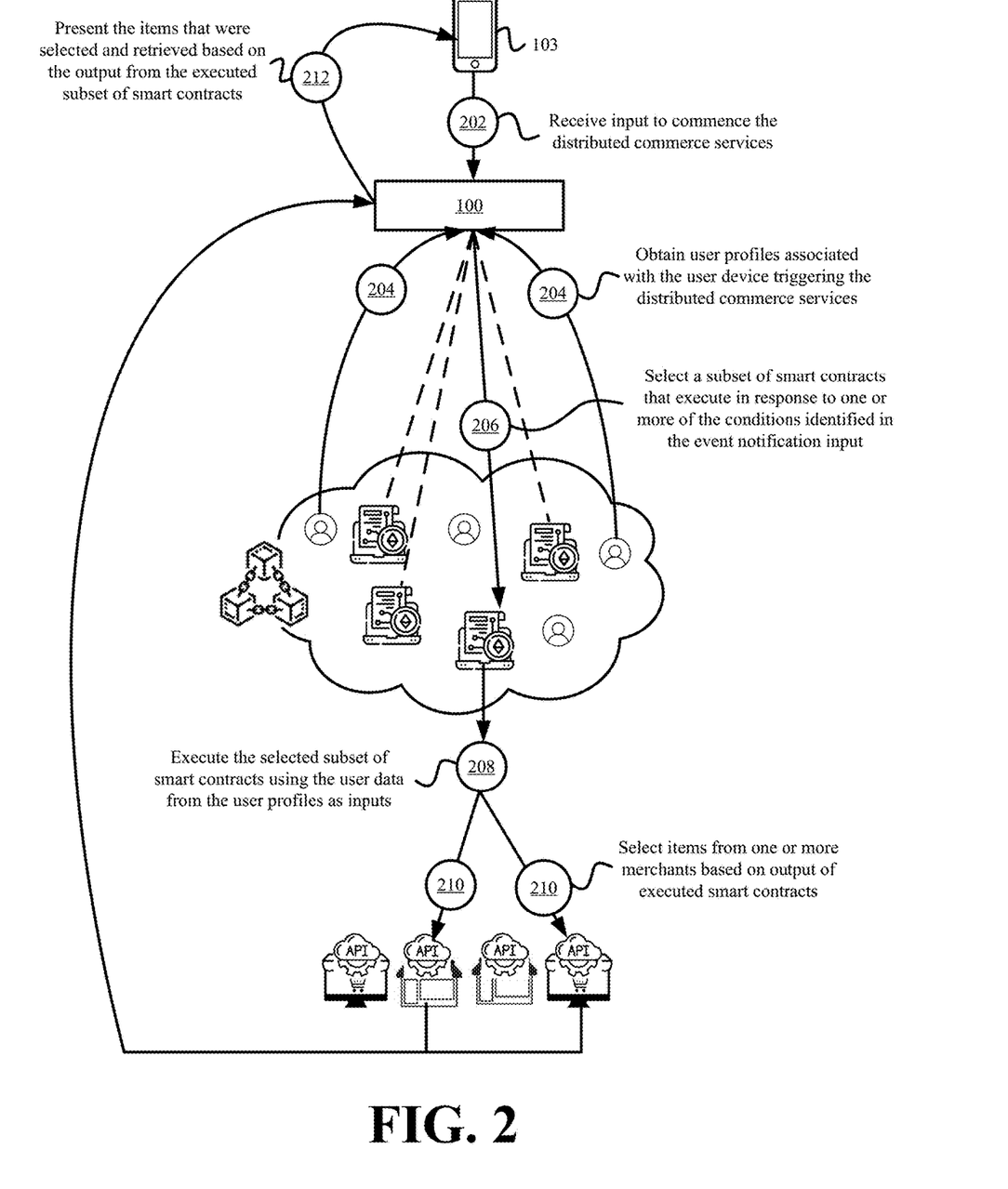
FIG. 2 illustrates an example of the distributed smart contract execution performed as part of the token economy created by an orchestration system in accordance with some embodiments.

FIG. 2 illustrates an example of the distributed smart contract execution performed as part of the token economy created by orchestration system 100 in accordance with some embodiments. The distributed smart contract execution may be initiated in response to orchestration receiving (at 202) event notification input from user device 103. The event notification input may identify any one or more conditions that initiate the distributed commerce services and/or execution of one or more smart contracts. In some embodiments, the event notification input may include a set of two or more satisfied, performed, or detected conditions. For instance, the event notification input may identify that user device 103 is at a particular location in which a particular event is taking place (e.g., a sporting event, a concert, a gathering, a festival, etc.), that the particular event is attended by one or more persons of interest, that the particular user has purchased or indicated interest in a first item, and that the weather at the particular event is of a certain temperature.

Orchestration system 100 may obtain (at 204) one or more user profiles that are associated with user device 103 or the particular user of user device 103 and that are stored on the blockchain. The user profiles may contain preferences, past behavior, purchases, activity, and/or other information that is associated with the user device 103 or the particular user.

Orchestration system 100 may query the distributed set of smart contracts to select (at 206) a subset of smart contracts that execute in response to one or more of the conditions identified in the event notification input. For instance, the event notification input may indicate that the particular user is at a sporting event involving a specific home team. Orchestration system 100 may identify a first smart contract that is defined on behalf of a first set of merchants for users attending concerts, and may not select the first smart contract for execution. Orchestration system 100 may identify a second smart contract that is defined on behalf of a second set of merchants for users attending the sporting event involving the specific home team. Accordingly, orchestration system 100 may select the second smart contract for execution.

Orchestration system 100 may execute (at 208) the selected subset of smart contracts using the compiled user data from the user profiles as inputs. For instance, a selected smart contract may be defined to promote merchandise of the second set of merchants that are relevant to the specific home team, and since the user is determined to be attending the sporting event with the specific home team, orchestration system 100 and the second set of merchants may have a higher conversion opportunity because the particular user is directly engaged with the specific home team and may therefore want to show support by purchasing the merchandise. Conversely, the same user browsing to the merchant sites when not attending the sporting event may have less excitement and/or engagement with the specific home team, and may therefore be less likely to result in a converted sale despite visiting the merchant sites.

In some embodiments, execution (at 208) of the subset of smart contracts may produce output that orchestration system 100 uses to select (at 210) specific items from one or more merchants. In some such embodiments, the outputs of the subset of smart contracts may include a first search query for an application programming interface ("API") or search interface of a first merchant that returns a first subset of items and/or offerings that the first merchant has selected to present to any users that satisfy the conditions specified in the smart contract, and may further include a second search query for an API or search interface of a second merchant that returns a second subset of items and/or offerings that the second merchant has selected to present to any users that satisfy the conditions specified in the smart contract. Orchestration system 100 may issue the first search query to the first merchant, may issue the second search query to the second merchant, may receive the first subset of items and/or offerings from the first merchant in response to the first search query, and may receive the second subset of items and/or offerings from the second merchant in response to the second search query.

Orchestration system 100 may present (at 212) the items that were selected and retrieved from the different merchants based on queries that are output from the executed subset of smart contracts. Specifically, execution (at 208) of each smart contract or the collective subset of smart contracts may target specific items or offerings based on the event notification input, the input parameters associated with the one or more user profiles of the particular user, and the smart contract definition that isolates items and/or offerings that different merchants have determined to be most relevant or of most interest to the particular user. For instance, the input parameters associated with the particular user may indicate a preference or past purchases for vintage designs or items. Accordingly, even though, the distributed commerce services are initiated in response to detecting the particular user at the particular sporting event with the specific home team and each merchant of the second set of merchants offering items related to the specific home team, orchestration system 100 may select and present (at 212) those items that have vintage designs or graphics to the particular user, while hiding items from other of the second set of merchants that may have updated, contemporary, and/or modern designs or graphics.

Orchestration system 100 may continually update and add new smart contracts to the distributed set of smart contracts that control the distributed commerce flow and that define the token economy. The new smart contracts may be defined for new items or inventory as well as new marketing strategies or campaigns that the merchants develop to target a specific set of customers that may not directly visit the merchants' platforms, but that satisfy various events or conditions that the merchants have identified to lead to higher conversion rates for their goods and services. In this manner, orchestration system 100 may establish a distributed platform that allows the participating merchants to reach potential customers anywhere and anytime without requiring the potential customers to visit physical or virtual storefronts of the merchants.

Orchestration system 100 may provide a privacy advantage for users by keeping user data with the user. In other words, orchestration system 100 may provide the distributed commerce services without exposing the user data to each participating merchant. The user data may be retained in the user profiles that the users create and manage via orchestration system 100. Orchestration system 100 may use the user data within the user profiles as input parameters for the smart contracts. However, the execution of the smart contracts remains with orchestration system 100, and orchestration system 100 may select different merchant offerings to present to the users based on the execution outcome of the smart contracts rather than on exposing the user data within the user profiles to the merchants. Consequently, the merchants do not receive the user data. Even when completing a transaction, orchestration system 100 may hide much of the user data from the selling merchant. For instance, orchestration system 100 may notify the merchant of an item that has been purchased, basic shipping information, and/or payment information.

Figure 3:
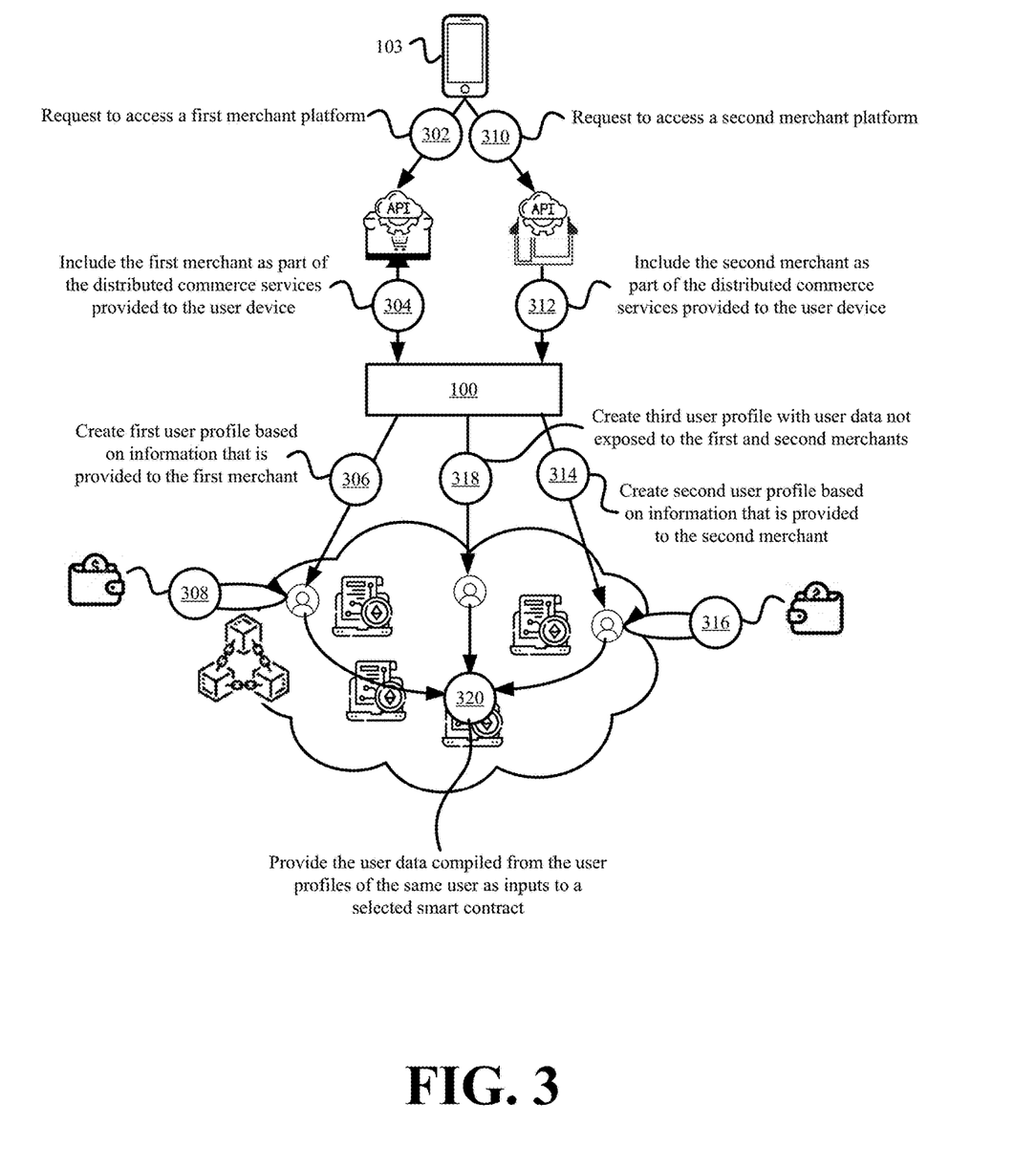
FIG. 3 illustrates an example of isolating user data from merchants as part of providing distributed commerce services to a user in accordance with some embodiments presented herein.

FIG. 3 illustrates an example of isolating user data from merchants as part of providing distributed commerce services to a user in accordance with some embodiments presented herein. User device 103 may access (at 302) the platform of first merchant. For instance, user device 103 may direct a web browser or other application to a domain name or Uniform Resource Locator ("URL") of the first merchant, or may open an application that directly communicates with the first merchant platform via an API exposed by the first merchant. The first merchant platform may be a virtual storefront or an online store that lists the different items the first merchant has for sale.

In creating an account on the platform of the first merchant or upon logging in to an existing account of the first merchant platform, user device 103 may have the option to register the first merchant platform as a distributed commerce participant. Specifically, the user is given the option to receive distributed commerce offers from the first merchant and other merchants the user has registered as distributed commerce participants.

In response to user device 103 affirmatively selecting (at 304) the first merchant as a distributed commerce participant, orchestration system 100 may generate (at 306) a first user profile on the blockchain based on the information contained within the account created with the first merchant or based on information that the user discloses to the first merchant when creating the account. For instance, the merchant account may include the user name, address, payment information, previous purchases made by the user from the first merchant, and/or various preferences the first merchant has tracked for the user when user device 103 has directly accessed the first merchant platform.

Orchestration system 100 may associate a unique identifier or signature of user device 103 to the first user profile. The unique identifier may be defined based on a make, model, network address, software versioning, and/or other fingerprinting of user device 103. In some embodiments, the unique identifier or signature may be replaced or supplemented with a username and password combination or some other means of verifying the identity of the user associated with user device 103.

In some embodiments, orchestration system 100 may generate (at 308) a digital wallet for the first user profile that is registered to the first merchant. The digital wallet may be funded with cryptocurrency or some other form of payment provided by the first merchant. The funds from the digital wallet may be used to pay for the gas fees and/or other blockchain fees associated with recording new blocks on the blockchain, minting NFTs, transferring NFTs for merchant offerings purchased by the user to and from the user profiles, and/or performing other blockchain related transactions.

Orchestration system 100 may create (at 314) a second user profile in response to user device 103 accessing (at 310) the platform of a second merchant, registering (at 312) the second merchant as another distributed commerce participant. Orchestration system 100 may populate the second user profile with user data that is provided to the second merchant or that is contained in a user account created with the second merchant. Orchestration system 100 may associate the same unique identifier or signature of user device 103 to the second user profile. Orchestration system 100 may generate (at 316) a different digital wallet for the second user profile, and may fund the second user profile that is registered to the second merchant with payment provided by the second merchant.

The first and second user profiles become linked by virtue of being associated with the same unique identifier. In some embodiments, orchestration system 100 may generate (at 318) and link a third user profile to the first and second user profiles. Orchestration system 100 may generate the third user profile based on user device 103 directly registering with orchestration system 100, and providing additional user data for preferences and/or interests of the user. For instance, the user may enumerate preferences or may identify accounts that the user has created on social media platforms and/or other sites where additional user preferences may be obtained for the user. In some embodiments, orchestration system 100 may automatically scour the web to obtain additional data about the user from publicly accessible sources such as social media sites, public records repositories, news publications, and/or other online postings, and may populate the user profile with the scraped user data from the external sources. The third user profile may also include a list of other merchants that the user has selected to receive distributed commerce offers from, and/or an exclusion list of merchants that are prohibited from offering or contracting the user through the distributed commerce channels created by orchestration system 100. Orchestration system 100 may allow user device 103 to edit, change, add, remove, and/or otherwise modify the user data that is contained in any of the user profiles created for the user and/or associated with user device 103. In some embodiments, orchestration system 100 may automatically generate the third user profile, and may populate the third user profile with additional user data that orchestration system 100 compiles from external or publicly available sources.

Accordingly, orchestration system 100 may create a first block on the blockchain with initial user data contained in a first user profile, and may generate additional blocks that are linked back to the first block as additional user profiles for the same user are created based on user device 103 accessing different merchants or as orchestration system 100 compiles additional user data for the user associated with user device 103. In this manner, orchestration system may create an evolving user profile that is stored on the blockchain.

Orchestration system 100 may hide the user data that is within the user profiles from the merchants. As shown in FIG. 3, orchestration system 100 may compile the user data from the different user profiles in response to an event that initiates the distributed commerce services, and may provide (at 320) the compiled user data as inputs to a set of smart contracts. Execution of the smart contracts determines which items from the different participating merchants to present to the user. However, orchestration system 100 performs the item selections using the smart contracts without exposing the compiled user data to the participating merchants.

Similarly, when the user wishes to purchase one of the offered items from a particular merchant, orchestration system 100 may broker the transaction without exposing the compiled user data to the particular merchant. Instead, orchestration system 100 may identify the item to the particular merchant, and may provide the necessary information (e.g., shipping information and payment information) needed by the particular merchant to complete the transaction.

Orchestration system 100 may incentivize the participation of merchants in the distributed commerce platform because their participation provides them with additional channels to reach potential customers. Specifically, orchestration system 100 allows the participating merchants to reach users anywhere and at anytime without the users accessing the merchants' platforms (e.g., online or physical storefront or directly accessing the applications and/or websites of the merchant). Moreover, orchestration system 100 improves merchant conversion rates by targeting the distributed commerce offerings with geographically, temporally, contextually, emotionally, and/or other relevant offerings. The increased relevancy of the offered items may create a sense of urgency for the user that does not exist or gets lost when the user leaves an event where the relevancy arises, separately accesses the merchant platform where the desired items may be found, searches through the merchant's platform to select the desired items using keywords, and goes through the ordering process.

Figure 4:
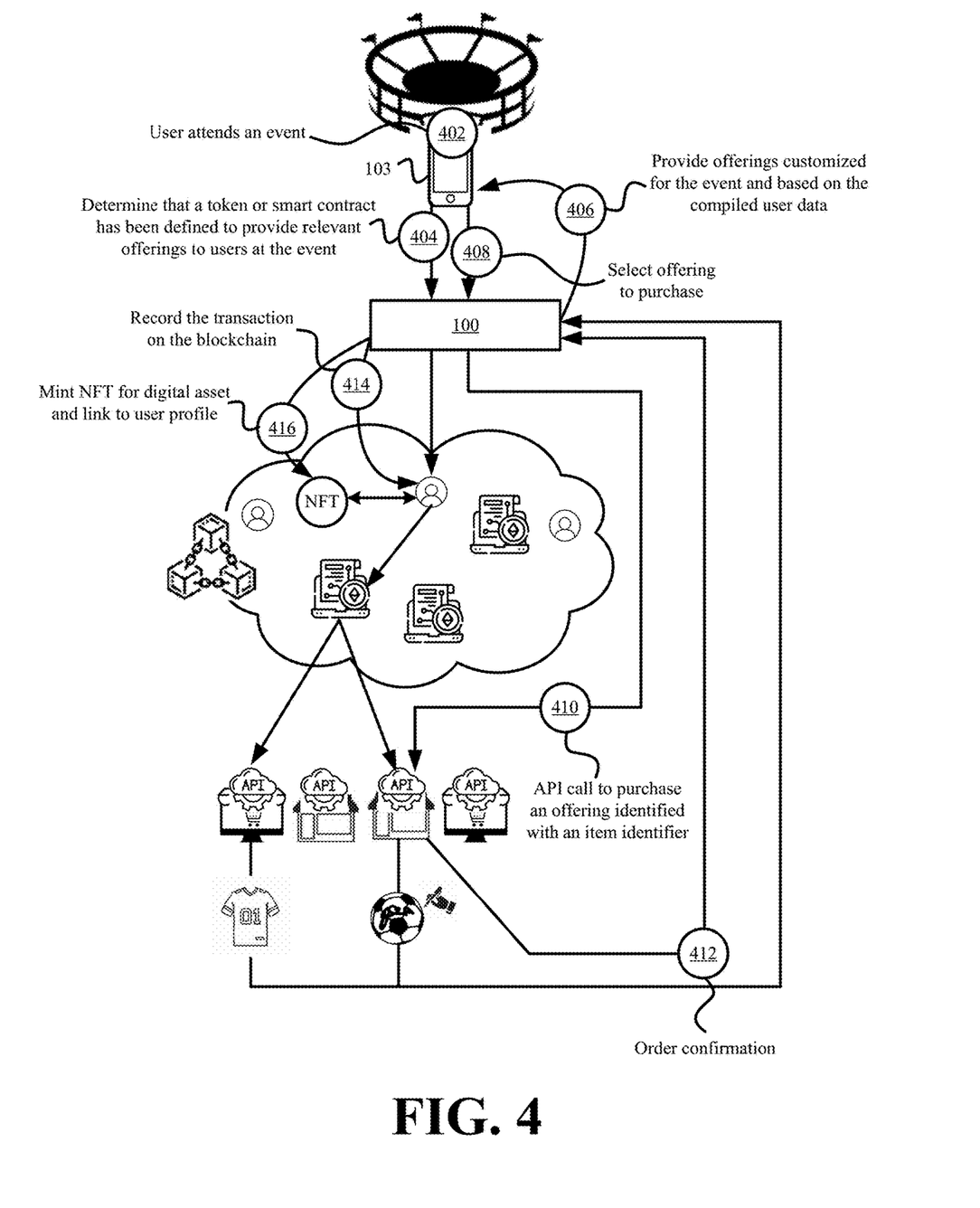
FIG. 4 illustrates an example of a distributed commerce transaction where geographic, temporal, contextual, emotional, and/or other relevancy is preserved for a buyer in accordance with some embodiments presented herein.

FIG. 4 illustrates an example of a distributed commerce transaction where geographic, temporal, contextual, emotional, and/or other relevancy is preserved for a buyer in accordance with some embodiments presented herein. As shown in FIG. 4, the user associated with user device 103 may attend (at 402) an event. Orchestration system 100 may initiate the distributed commerce services in response to receiving location information from user device 103 and determining (at 404) that the received location is associated with an event and that one or more tokens or smart contracts have been defined to provide geographically, temporally, contextually, emotionally, and/or other relevant offerings to users at the event.

Orchestration system 100 may provide (at 406) a custom set of offerings from a set of merchants to user device 103 while user device 103 remains at the event. Orchestration system 100 may provide (at 406) the custom set of offerings in response to executing the one or more smart contracts using compiled user data within the user profiles of user device 103 as inputs. Specifically, each offering from the custom set of offerings may be geographically, temporally, contextually, emotionally, and/or otherwise relevant to the event that the user is attending and may be customized based on the preferences, purchase history, and/or other user data contained within the user profiles. For instance, the user profile may indicate that the user has a favorite athlete that is participating at the event. Accordingly, the custom set of offerings may include autographed memorabilia signed by the user's favorite athlete as well as jerseys of the user's favorite athlete. In other words, orchestration system 100 does not simply provide any and all offerings that are relevant for the event, but customizes the offerings so that they are also relevant to the user data contained in the user profiles associated with user device 103. Each offering may be associated with a URL or other identifier in the API, database, or other inventory management system of the merchant providing that offering.

User device 103 may generate an interactive UI that presents each offering from the custom set of offerings, and the user may select the presented offering to purchase or learn more about via input provided to the UI. The distributed commerce transaction may be initiated in response to user device 103 signaling (at 408) to orchestration system 100 the selection of an offering from a particular merchant that the associated user wishes to purchase or learn more about.

Orchestration system 100 may determine the merchant that provides the selected offering, and may submit (at 410) the identifier associated with the selected offering to that merchant along with a transaction request to purchase the selected offering. For instance, orchestration system 100 may issue a call to the merchant API with the selected item identifier. The call may indicate the requested user action. For instance, orchestration system 100 may issue a first API call to initiate a purchase of the selected item, and may issue a second API call to request additional information about the selected item. Orchestration system 100 may provide additional information with each call. For instance, the API call for purchasing an item may include an identifier for the user profile of the user that is purchasing the item and that previously registered with the particular merchant so that the particular merchant may obtain the user's name, shipping information, payment information, and/or other information to complete the purchase.

Orchestration system 100 may receive (at 412) confirmation from the particular merchant when the order has been received, processed, and/or fulfilled, and may provide the confirmation to user device 103. Additionally, orchestration system 100 may record (at 414) the transaction on the blockchain. Recording (at 414) the transaction may include recording the item identifier and/or other information about the item to the user profile that is registered with the particular merchant.

Orchestration system 100 may also mint (at 416) or create an NFT for an item that exists only in digital form or that is digital representation of the purchased physical item. Orchestration system 100 may link the NFT to the user profile so that the user is recorded as the owner of the digital asset or the digital representation of the physical asset.

In some embodiments, orchestration system 100 may enhance the value of a physical good by automatically creating the digital representation of the physical good, and by allowing the user to use the digital representation in various digital environments. For instance, if the user purchases a physical hat with a specific design, orchestration system 100 may generate a three-dimensional ("3D") or two-dimensional ("2D") digital model of the same hat with the specific design, and the model may be compatible with other digital assets in various digital environments. For instance, the model may be used to customize the appearance of a digital character in a game or digital representation of the user in the metaverse, to populate a digital closet or wardrobe of the user, and/or to enhance other digital environments. In some embodiments, orchestration system 100 may also mint an NFT or other token to record the user as the owner of that digital model or digital asset. Accordingly, orchestration system 100 enhances the value of the physical good by selling the physical good along with a digital representation of that physical good that may be interacted with, sold, or exchanged for other digital assets in the digital environments.

Figure 5:
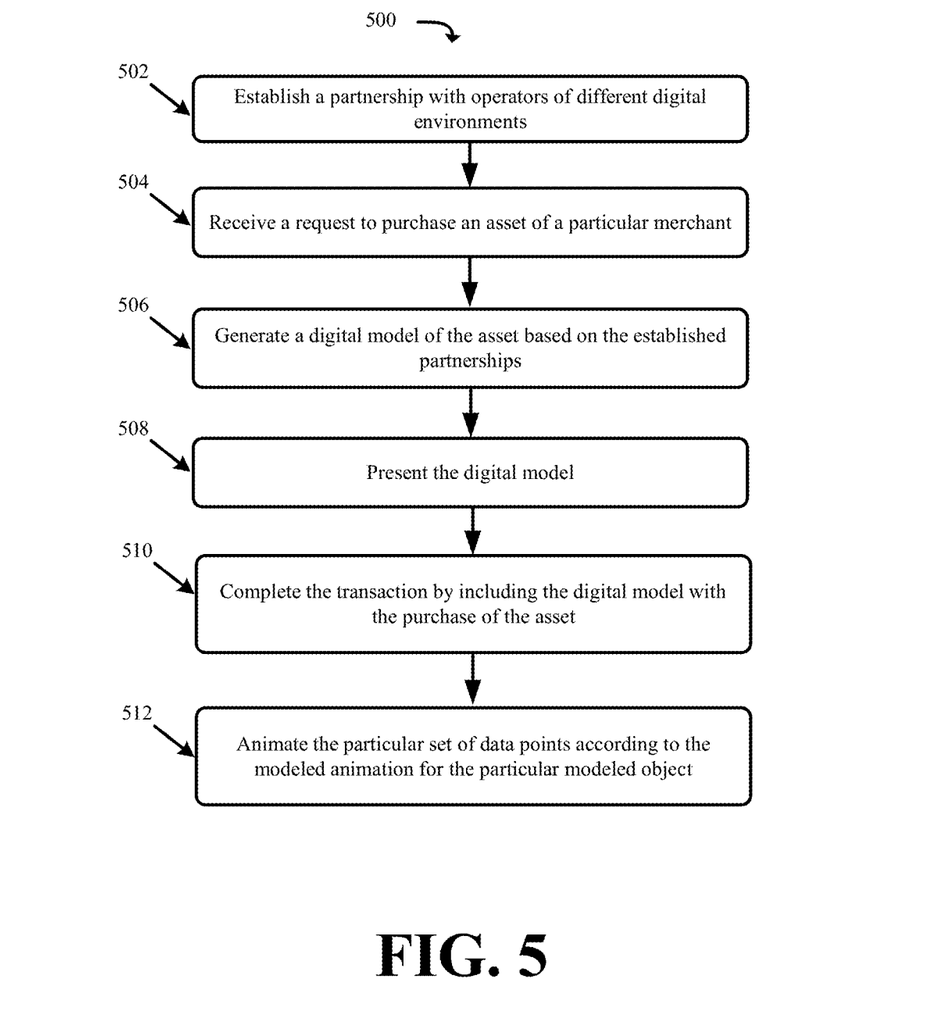
FIG. 5 presents a process for enhancing the distributed commerce channels that are available to merchants in accordance with some embodiments presented herein.

FIG. 5 presents a process 500 for enhancing the distributed commerce channels that are available to merchants in accordance with some embodiments presented herein. Process 500 may be implemented by orchestration system 100.

Process 500 may include establishing (at 502) a partnership between orchestration system 100 and operators of different digital environments. The digital environment operators may include video game publishers, digital asset and/or NFT marketplaces, social media platforms with digital worlds, digital asset creators, metaverse creators, and/or other digital environments with customizable digital characters, avatars, and/or other objects.

Establishing (at 502) the partnership may include receiving the formatting by which digital assets may be added to or included as part of the digital world, and receiving access to upload or insert the digital assets as part of the digital world. For instance, a digital environment operator may provide orchestration system 100 access to an API by which orchestration system 100 may insert new digital assets into the digital environment and/or customize existing assets (e.g., digital characters, avatars, and/or other objects).

Process 500 may include receiving (at 504) a request from user device 103 to purchase an asset of a particular merchant. Process 500 may include generating (at 506) one or more digital models of the asset based on the established (at 502) partnerships with the digital environment operators. In some embodiments, the asset may be a physical good such as clothing, a car, furniture, and/or other physical objects. In some such embodiments, the digital models may be digital representations of the physical goods for insertion in the digital environments. In some embodiments, the asset may be a digital good such as a digital artwork, a digital representation of an object, and/or another digital asset. In some such embodiments, the digital models may format the digital good so that it becomes compatible with and may be inserted into one or more of the digital environments.

Process 500 may include presenting (at 508) the digital models to the user purchasing the asset. In some embodiments, the digital models may be included with the purchase of the asset as additional value provided by the distributed commerce. In some embodiments, the digital models may be sold at additional cost.

Process 500 may include completing (at 510) the transaction by including the digital models with the purchase of the asset. In some embodiments, completing (at 510) the transaction may include processing any payment to acquire the assets and/or the digital models. In some embodiments, completing (at 510) the transaction may include generating or minting an NFT for each digital model, and associating or linking the NFT with the user profile on the blockchain. Associating the NFT with the user profile may establish the user as the owner of the digital models so that the user may import or add the digital models from the user profile to one or more digital environments. For instance, the user may log into or access a digital environment via credentials stored in the user profile. Once the user profile is linked to the digital environment, the user may import the digital models directly into the digital environment from the user profile. Alternatively, the user may provide a blockchain address or identifier for the user profiles to the digital environment, and the compatible digital models associated with the user profile may be imported into the digital environment.

Upon completion (at 510) of the transaction, the user may exchange, sell, trade, and/or interact with the digital model or digital asset. Accordingly, the digital model or digital asset may have intrinsic value that is separate from the physical asset.

In some embodiments, the distributed commerce may be expanded to perform distributed rewards programs on behalf of the participating merchants. In some such embodiments, orchestration system 100 may be adapted to track user loyalty for the merchants outside the physical and digital storefronts of the merchants, and may be further adapted to push rewards, promotions, coupons, item information, and/or provide other data that is geographically, temporally, contextually, emotionally, and/or otherwise relevant to the users on behalf of different merchants wherever the users may be located.

With the ability to track user loyalty and push the geographically, temporally, contextually, emotionally, and/or other relevant rewards to the users, orchestration system 100 may further increase conversion rates for the merchants. Specifically, the rewards may increase the geographic, temporal, contextual, emotional, and/or other significance of the merchants' offerings to the users so that there is a greater urgency for the users to complete a transaction wherever they may be.

Figure 6:
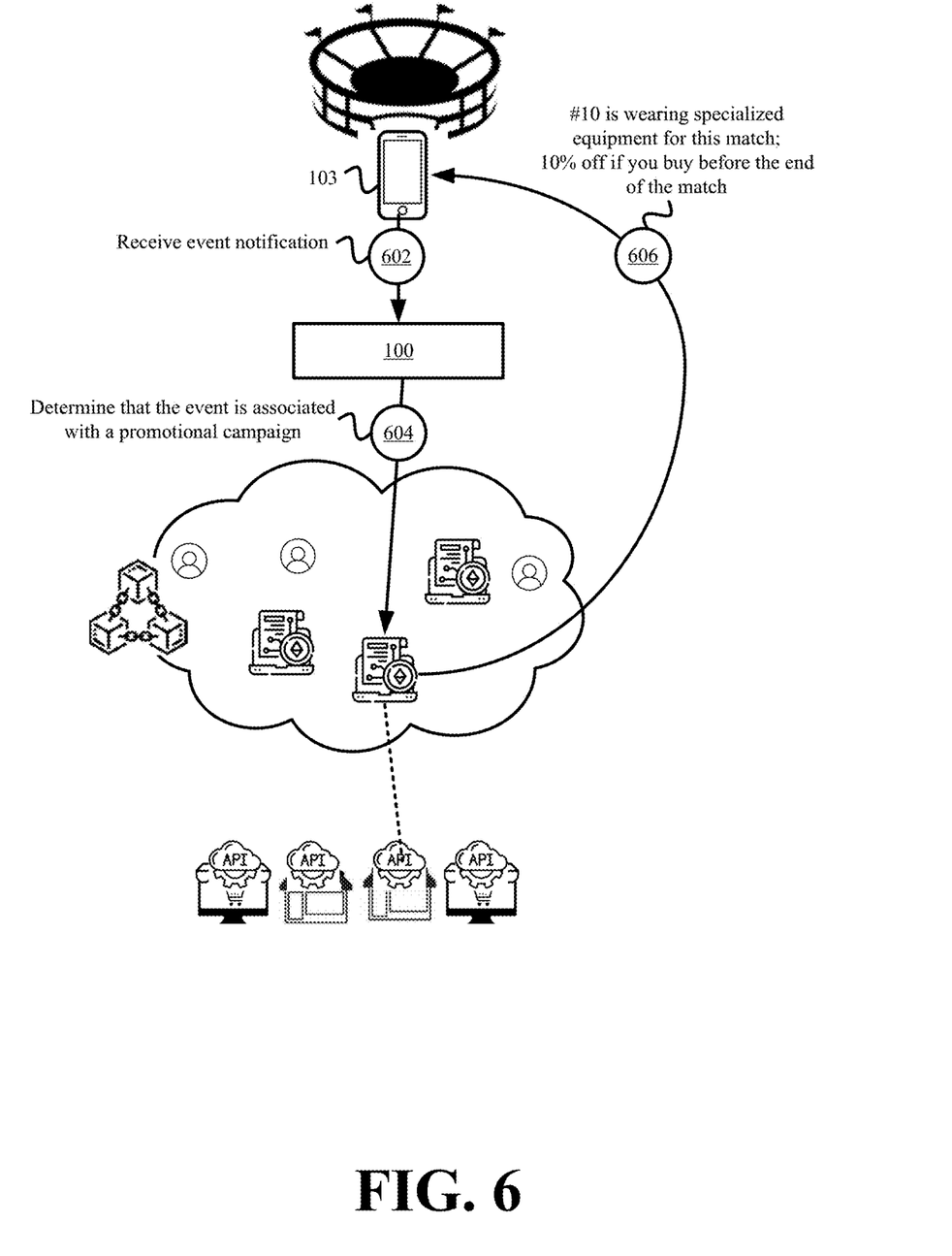
FIG. 6 illustrates an example of a distributed rewards program implemented by the orchestration system on behalf of different merchants in accordance with some embodiments presented herein.

FIG. 6 illustrates an example of a distributed rewards program implemented by orchestration system 100 on behalf of different merchants in accordance with some embodiments presented herein. Orchestration system 100 may receive (at 602) an event notification from user device 103.

The event may indicate that the user associated with user device 103 is attending a sporting event. Orchestration system 100 may execute (at 604) one or more smart contracts on the blockchain that were defined for the event and that associate the event with a promotional campaign because one of the star athletes is wearing and/or using specialized equipment (e.g., limited edition shoes, specialized golf clubs, etc.).

The output resulting from executing the one or more smart contracts may include orchestration system 100 sending (at 606) user device 103 promotional information that identifies the specialized equipment used by the star athlete. The promotional information is intended to have the effect of increasing the contextual and emotional urgency for the user attending the event where the specialized equipment was used. Additionally, orchestration system 100 may also send (at 606) user device 103 a limited time promotion for purchasing the specialized equipment from a merchant offering those goods. For instance, orchestration system 100 may provide a 10% off coupon code if the user is to purchase the specialized equipment while at the sporting event. The limited time coupon code is intended to have the effect of increasing the geographical and temporal urgency of the user to complete the transaction while at the event and the promotional offer remains valid.

In doing so, orchestration system 100 may increase conversion rates for the merchant involving customers that may be anywhere in the world and that may never access a physical or virtual storefront of the merchant. For instance, the user may be urged to purchase the specialized equipment due the contextual, emotional, geographical, and temporal urgency created by the promotional campaign, rather than wait until going home, visiting the merchant's storefront, searching through the inventory to find the specialized equipment, and then complete the purchase at which point in time the urgency and/or desire to purchase the specialized equipment may have waned.

Figure 7:
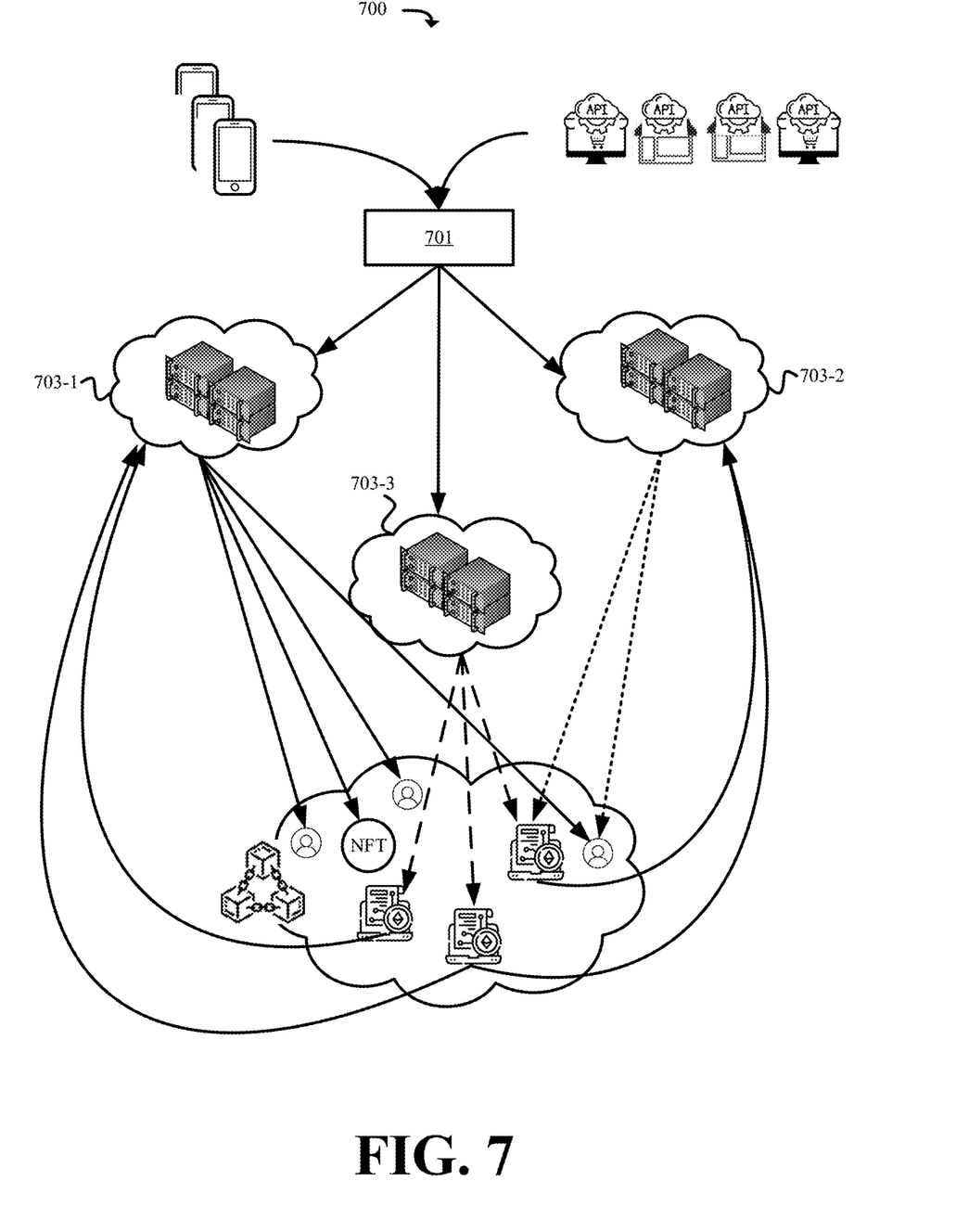
FIG. 7 illustrates an example architecture for implementing orchestration system 100 in accordance with some embodiments.

FIG. 7 illustrates an example architecture 700 for implementing orchestration system 100 in accordance with some embodiments. Architecture 700 may be a serverless architecture that may be controlled by orchestration controller 701.

Orchestration controller 701 may include one or more machines with hardware processors and/or other computing resources that provide a network-accessible API or other interface for user devices and for merchants to access the orchestration system services and functionality. Orchestration controller 701 may dynamically allocate resources from one or more cloud computing devices or machines 703-1, 703-2, and 703-3 in response to events that trigger smart contract execution for different user devices, user profile creation, and/or interactions with merchant APIs. For instance, orchestration controller 701 may intercept or receive a request from a first user device to register with a particular merchant, may wake or allocate a first distributed computing machine from cloud computing devices or machines 703-1 to generate the user profile of the particular user device with the particular merchant, may receive an event from a second user device, and may wake or allocate a second distributed computing machine from cloud computing devices or machines 703-2 to compile the user data from the user profiles associated with the second user device, to execute a set of smart contracts, and to retrieve and present relevant offerings from different merchants to the second user device based on the outcome of the executed set of smart contracts. Each of the cloud computing devices or machines 703-1, 703-2, and 703-3 may execute using one or more hardware processors, memory, storage, network resources, and/or other computing resources.

Architecture 700 may further include the smart contracts or executable code that may be stored on blockchain 705 or in cloud storage devices. The smart contracts or executable code may contain the conditions that different merchants have specified for presenting their goods, services, and/or other offerings to user devices that are associated with different events and compiled user data. The smart contracts or executable code output may include API calls or queries with which the different merchant offerings are retrieved from the merchant databases or repositories once the conditions of one or more smart contracts or executable code have been satisfied.

Blockchain 705 may also be used to store user profiles, NFTs for purchased digital assets, identifiers for purchased physical goods from different merchants, and/or other data. In some embodiments, orchestration system 100 may use different blockchains for different transactions or based on merchant preferences. For instance, a first blockchain may be cheaper (e.g., lower gas and/or transaction fees) and faster for storing and accessing the user profiles, and a second blockchain may be cheaper and faster for NFT creation and management.

Figure 8:
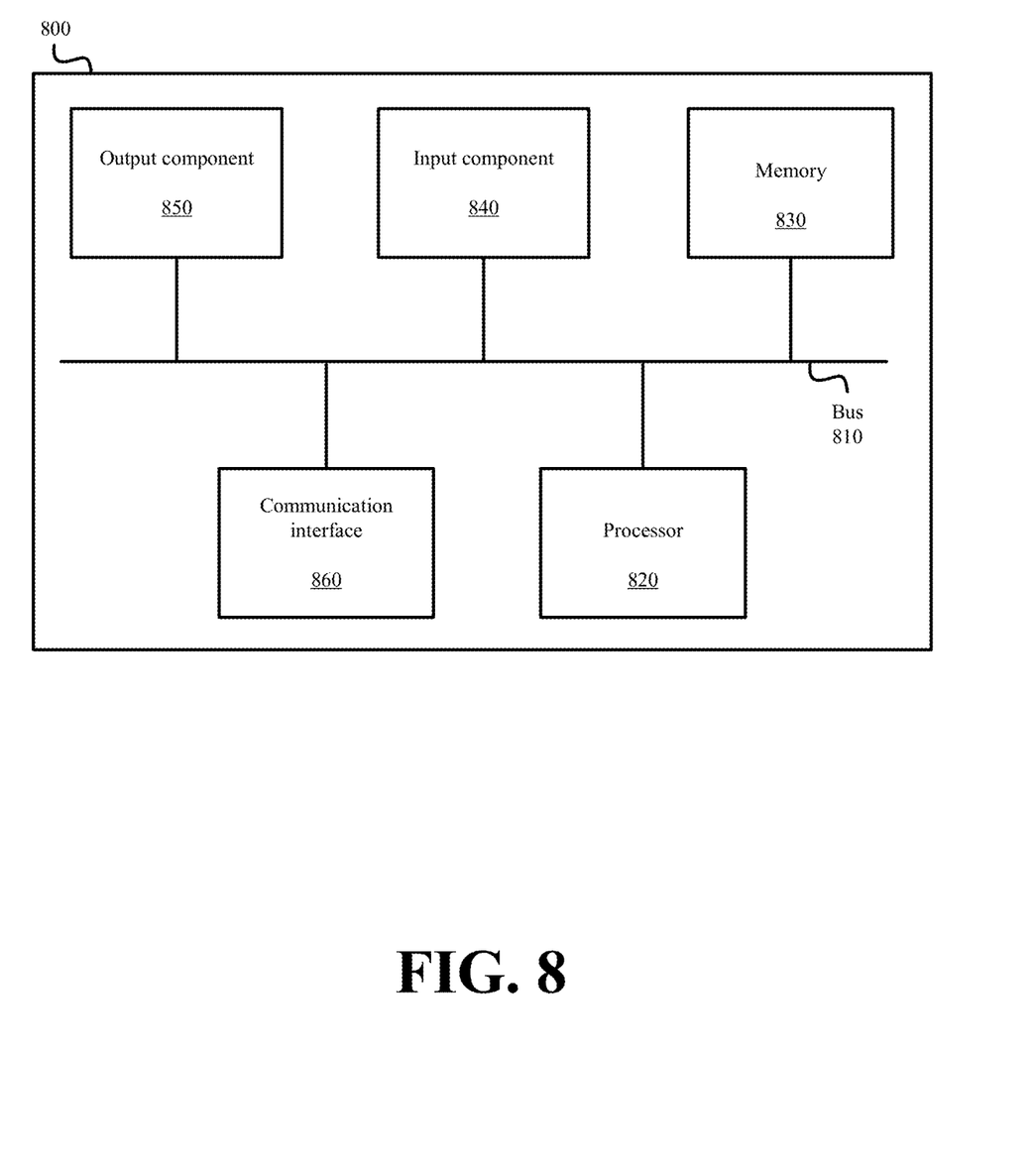
FIG. 8 illustrates example components of one or more devices, according to one or more embodiments described herein.

FIG. 8 is a diagram of example components of device 800. Device 800 may be used to implement one or more of the devices or systems described above (e.g., orchestration system 100, orchestration controller 701, cloud computing devices or machines 703-1, 703-2, and 703-3 , and/or components of architecture 700). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A computer-implemented method comprising:
   registering a plurality of merchants with an orchestration system, wherein registering the plurality of merchants comprises defining a plurality of smart contracts on a blockchain, each smart contract of the plurality of smart contracts comprising executable code that specifies a plurality of conditions by which goods of a merchant from the plurality of merchants are selectively promoted;
   receiving, at the orchestration system, a triggering event from a user device;
   compiling, by operation of one or more processors of the orchestration system, user data from one or more user profiles that are associated with the user device;
   selecting, by operation of the one or more processors, one or more of the plurality of smart contracts that are defined on the blockchain with at least one condition of the plurality of conditions that is satisfied by the triggering event;
   executing, by operation of the one or more processors, the executable code from the one or more smart contracts using the user data as inputs, wherein executing the executable code comprises:
      determining that the user data and the triggering event satisfy the plurality of conditions specified in each of the one or more smart contracts; and
      activating a promotion of a customized set of goods from a set of the plurality of merchants without the user device querying for the customized set of goods or visiting sites of the set of merchants in response to determining that the user data and the triggering event satisfy the plurality of conditions;
   generating, by operation of the one or more processors, a single user interface that aggregates and presents offerings related to the promotion of the customized set of goods from the sites of the set of merchants; and
   providing the single user interface with the offerings from the orchestration system to the user device.

2. The computer-implemented method of claim 1 further comprising:
   completing a transaction for a particular good from the customized set of goods in response to input from the user device, wherein completing the transaction comprises:
      calling an application programming interface ("API") of a particular merchant from the set of merchants with an identifier of the particular good;
      receiving confirmation from the API that the particular merchant has received the identifier; and
      recording the transaction on the blockchain.

3. The computer-implemented method of claim 1 further comprising:
   generating each smart contract of the plurality of smart contracts on the blockchain with a different set of conditions specified by a different merchant of the plurality of merchants, and one or more goods of that different merchant that are selected in response to the set of conditions being satisfied.

4. The computer-implemented method of claim 1 further comprising:
   retrieving information about each good from the customized set of goods by calling APIs of the set of merchants.

5. The computer-implemented method of claim 1, wherein executing the executable code comprises:
   receiving a query from a particular smart contract of the one or more smart contracts in response to determining that the user data and the triggering event satisfy the plurality of conditions specified for the particular smart contract; and
   querying an inventory of a particular merchant from the set of merchants using the query;
   retrieving one or more offerings related to the customized set of goods from the particular merchant in response to querying the inventory of the particular merchant.

6. The computer-implemented method of claim 1 further comprising:
generating a digital representation of a particular good from the customized set of good that is a physical good; and
presenting the particular good and the digital representation for sale to the user device.

7. The computer-implemented method of claim 1 further comprising:
receiving a request to purchase a particular good, that is from the customized set of goods, from the user device, wherein the particular good is a physical good;
generating a digital representation of the physical good; and
minting a non-fungible token ("NFT") for the digital representation on the blockchain, wherein minting the NFT comprises recording a user associated with the user device as an owner of the digital representation.

8. The computer-implemented method of claim 7 further comprising:
adding the digital representation and the purchase of the particular offering good to the one or more user profiles.

9. The computer-implemented method of claim 1 further comprising:
determining a location of the user device based on the triggering event; and
wherein activating the promotion of the customized set of goods comprises:
selecting the customized set of goods, that are relevant to the location and that satisfy a set of user preferences contained within the user data while the user device remains at that location, from a plurality of goods offered by the set of merchants.

10. The computer-implemented method of claim 1 further comprising:
determining that the user device is located at a live event based on the triggering event;
wherein activating the promotion of the customized set of goods comprises:
determining one or more items goods with a contextual, emotional, temporal, or geographical relevance to the live event; and
retrieving descriptions for the one or more goods from the set of merchants.

11. The computer-implemented method of claim 1 further comprising:
determining a location of the user device based on the triggering event; and
wherein activating the promotion of the customized set of goods comprises:
selecting one or more promotions from the set of merchants that increase with a contextual, emotional, temporal, or geographical relevance of items sold by the set of merchants to the location.

12. The computer-implemented method of claim 1 further comprising:
determining a location of the user device based on the triggering event; and
wherein providing the single user interface comprises:
providing the user device with a promotion that expires upon the user device leaving the location or a specified time after determining the location of the user device.

13. A system comprising:
one or more hardware processors configured to:
register a plurality of merchants with an orchestration system, wherein registering the plurality of merchants comprises defining a plurality of smart contracts on a blockchain, each smart contract of the plurality of smart contracts comprising executable code that specifies a plurality of conditions by which goods of a merchant from the plurality of merchants are selectively promoted;
receive a triggering event from a user device;
compile user data from one or more user profiles that are associated with the user device;
select one or more of the plurality of smart contracts that are defined on the blockchain with at least one condition of the plurality of conditions that is satisfied by the triggering event;
execute the executable code from the one or more smart contracts using the user data as inputs, wherein executing the executable code comprises:
determining that the user data and the triggering event satisfy the plurality of conditions specified in each of the one or more smart contracts; and
activating a promotion of a customized set of goods from a set of the plurality of merchants without the user device querying for the customized set of goods or visiting sites of the set of merchants in response to determining that the user data and the triggering event satisfy the plurality of conditions;
generate a single user interface that aggregates and presents offerings related to the promotion of the customized set of goods from the sites of the set of merchants; and
provide the single user interface with the offerings to the user device.

14. The system of claim 13, wherein the one or more hardware processors are further configured to:
complete a transaction for a particular good from the customized set of goods in response to input from the user device, wherein completing the transaction comprises:
call an application programming interface ("API") of a particular merchant from the set of merchants with an identifier of the particular good;
receive confirmation from the API that the particular merchant has received the identifier; and
record the transaction on the blockchain.

15. The system of claim 13, wherein the one or more hardware processors are further configured to:
generate each smart contract of the plurality of smart contracts on the blockchain with a different set of conditions specified by a different merchant of the plurality of merchants, and one or more goods of that different merchant that are selected in response to the set of conditions being satisfied.

16. The system of claim 13, wherein the one or more hardware processors are further configured to:
retrieve information about each good from the customized set of goods by calling APIs of the set of merchants.

17. The system of claim 13, wherein executing the executable code comprises:
receiving a query from a particular smart contract of the one or more smart contracts in response to determining that the user data and the triggering event satisfy the plurality of conditions specified for the particular smart contract;
querying an inventory of a particular merchant from the set of merchants using the query; and retrieving one or more offerings related to the customized set of offerings goods from the particular merchant in response to querying the inventory of the particular merchant.

18. The system of claim 13, wherein the one or more hardware processors are further configured to:
generate a digital representation of a particular good from the customized set of good that is a physical good; and
present the particular good and the digital representation for sale to the user device.

19. The system of claim 13, wherein the one or more hardware processors are further configured to:
receive a request to purchase a particular good, that is from the customized set of goods, from the user device, wherein the particular good is a physical good;
generate a digital representation of the physical good; and
mint a non-fungible token ("NFT") for the digital representation on the blockchain, wherein minting the NFT comprises recording a user associated with the user device as an owner of the digital representation.

20. A non-transitory computer-readable medium storing a plurality of processor-executable instructions that, when executed by one or more processors, cause a computing system to perform operations comprising:
register a plurality of merchants with an orchestration system, wherein registering the plurality of merchants comprises defining a plurality of smart contracts on a blockchain, each smart contract of the plurality of smart contracts comprising executable code that specifies a plurality of conditions by which goods of a merchant from the plurality of merchants are selectively promoted;
receive a triggering event from a user device;
compile user data from one or more user profiles that are associated with the user device;
select one or more of the plurality of smart contracts that are defined on the blockchain with at least one condition of the plurality of conditions that is satisfied by the triggering event;
execute the executable code from the one or more smart contracts using the user data as inputs, wherein executing the executable code comprises:
determining that the user data and the triggering event satisfy the plurality of conditions specified in each of the one or more smart contracts; and
activating a promotion of a customized set of goods from a set of the plurality of merchants without the user device querying for the customized set of goods or visiting sites of the set of merchants in response to determining that the user data and the triggering event satisfy the plurality of conditions;
generate a single user interface that aggregates and presents offerings related to the promotion of the customized set of goods from the sites of the set of merchants; and
provide the single user interface with the offerings to the user device.

* * * * *